July 8, 1930. A. A. G. MOUGEOTTE 1,770,321
CHAIR
Filed April 16, 1928 7 Sheets-Sheet 2

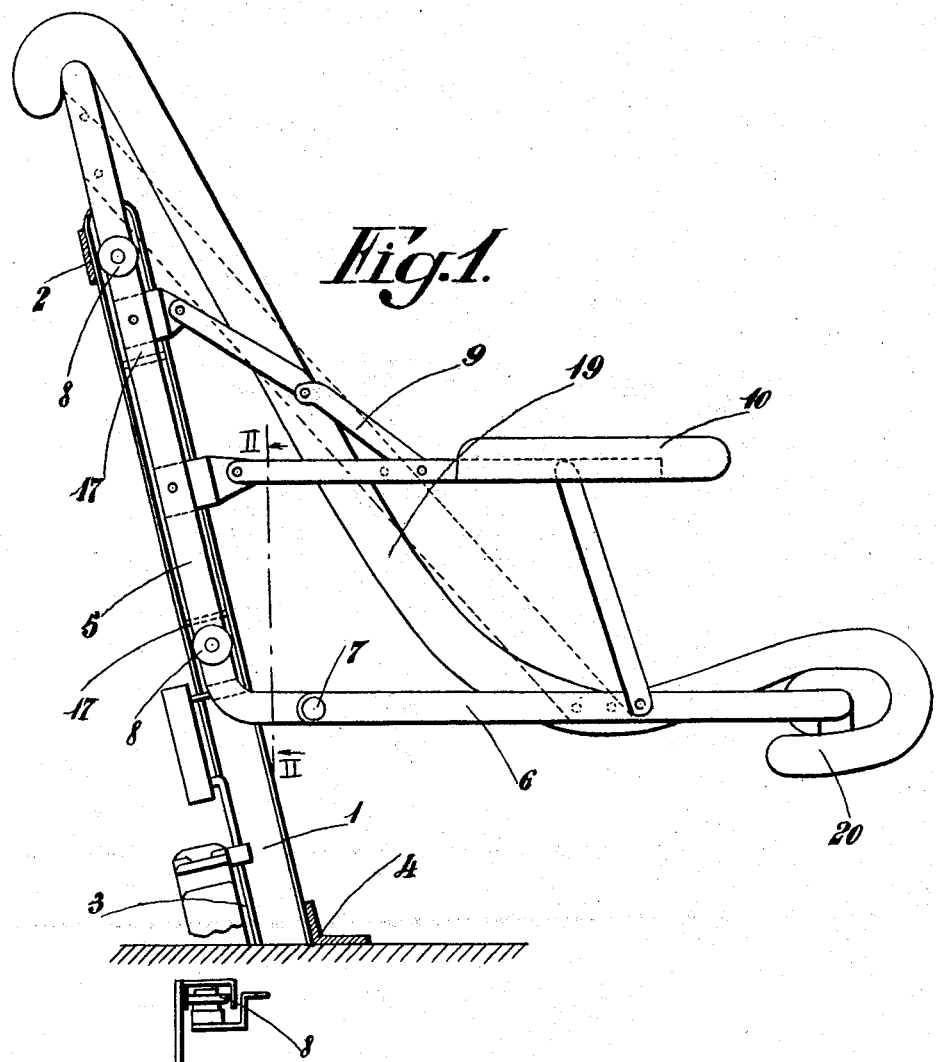

Inventor
Auguste A. G. Mougeotte
by Wilkinson & Giusta
Attorneys.

July 8, 1930.  A. A. G. MOUGEOTTE  1,770,321
CHAIR
Filed April 16, 1928   7 Sheets-Sheet 3
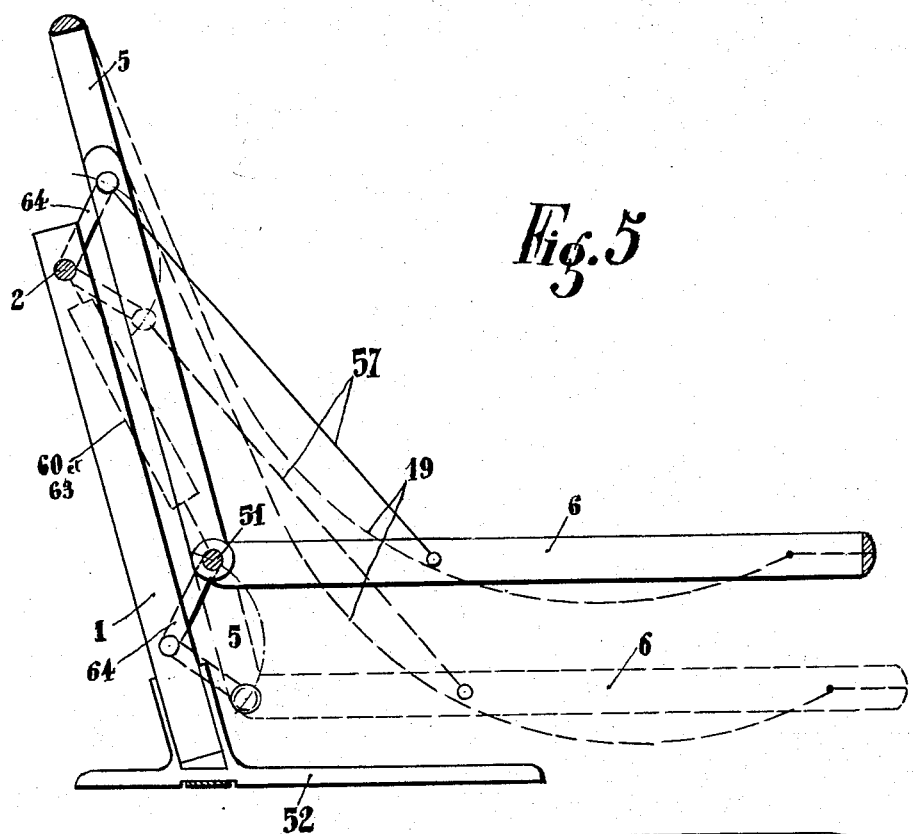
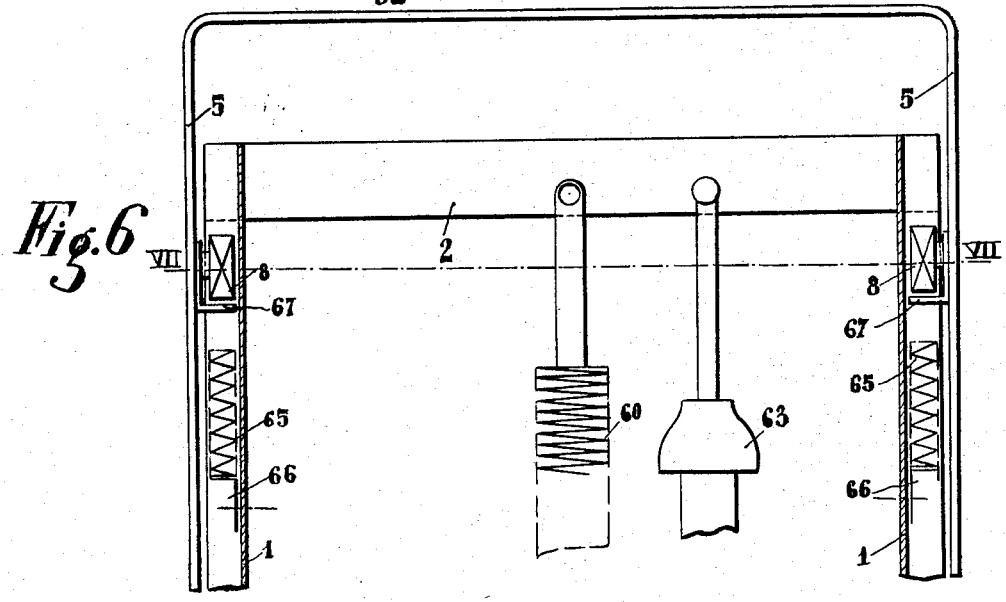
Inventor
Auguste A. G. Mougeotte
by Wilkinson & Giusta
Attorneys.

July 8, 1930.　　　　A. A. G. MOUGEOTTE　　　　1,770,321
CHAIR
Filed April 16, 1928　　　7 Sheets-Sheet 4
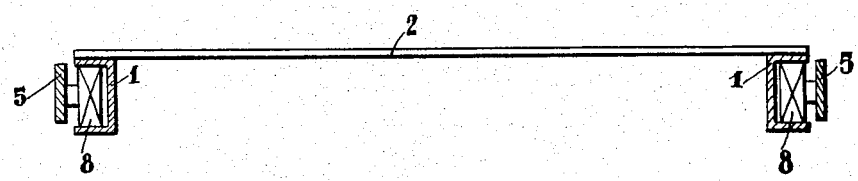
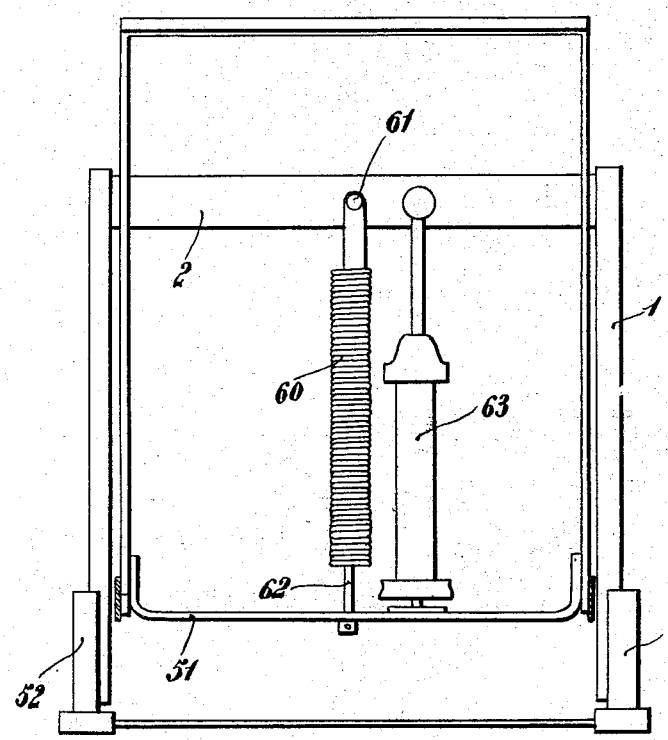
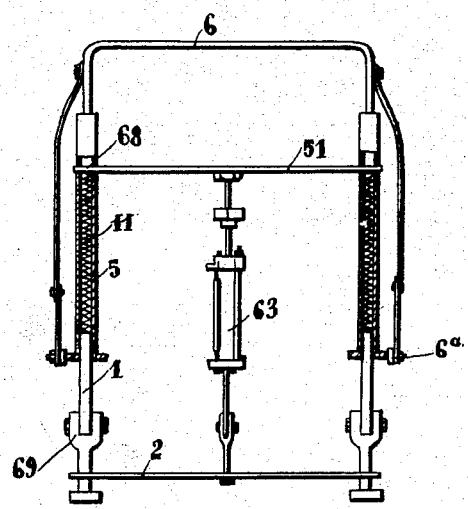
Inventor
Auguste A. G. Mougeotte
by Wilkinson & Ginota
Attorneys.

July 8, 1930.  A. A. G. MOUGEOTTE  1,770,321
CHAIR
Filed April 16, 1928    7 Sheets-Sheet 5
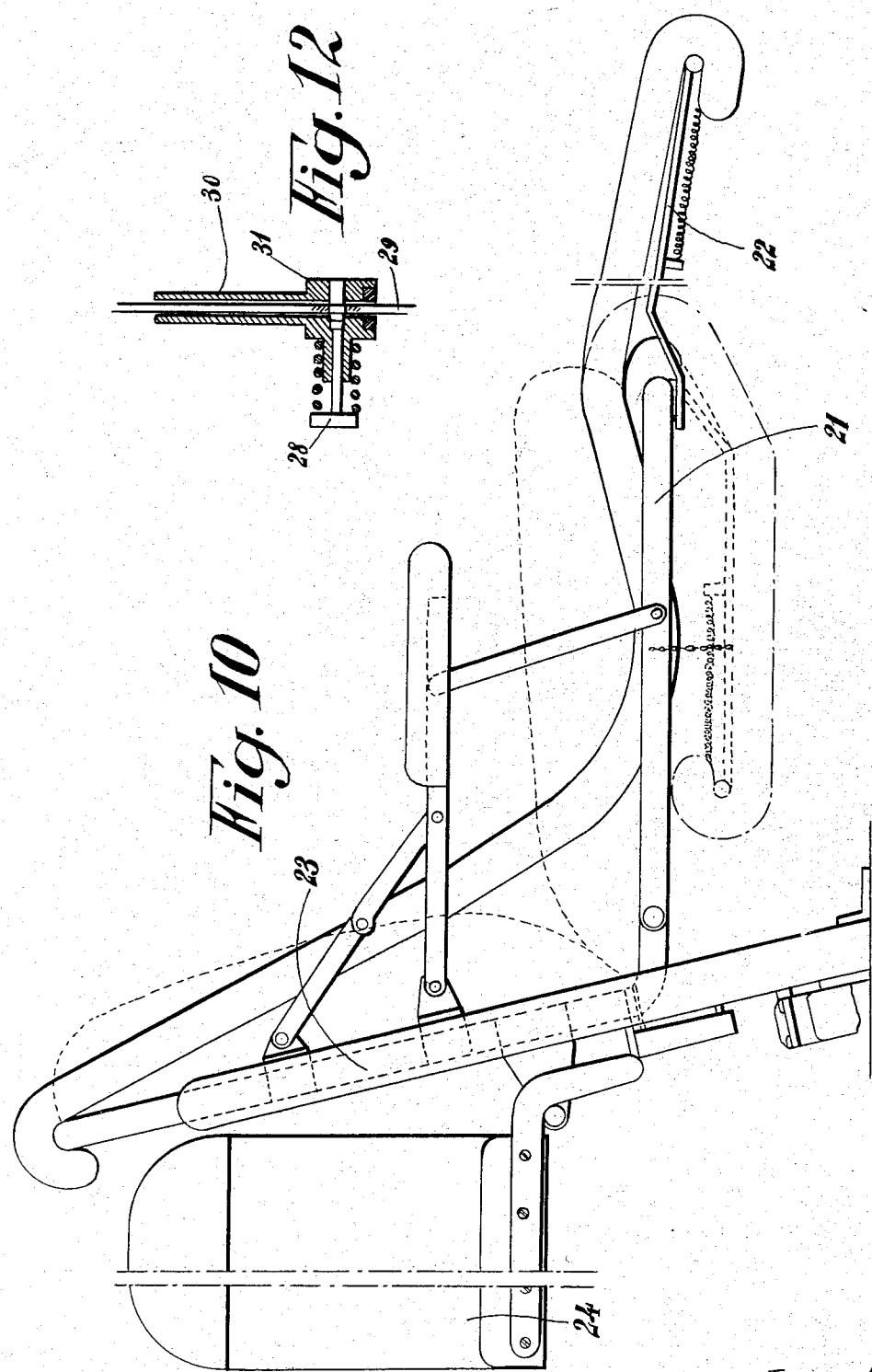
Inventor
Auguste A. G. Mougeotte
by Wilkinson & Giusta
Attorneys.

July 8, 1930.     A. A. G. MOUGEOTTE     1,770,321
CHAIR
Filed April 16, 1928     7 Sheets-Sheet 6
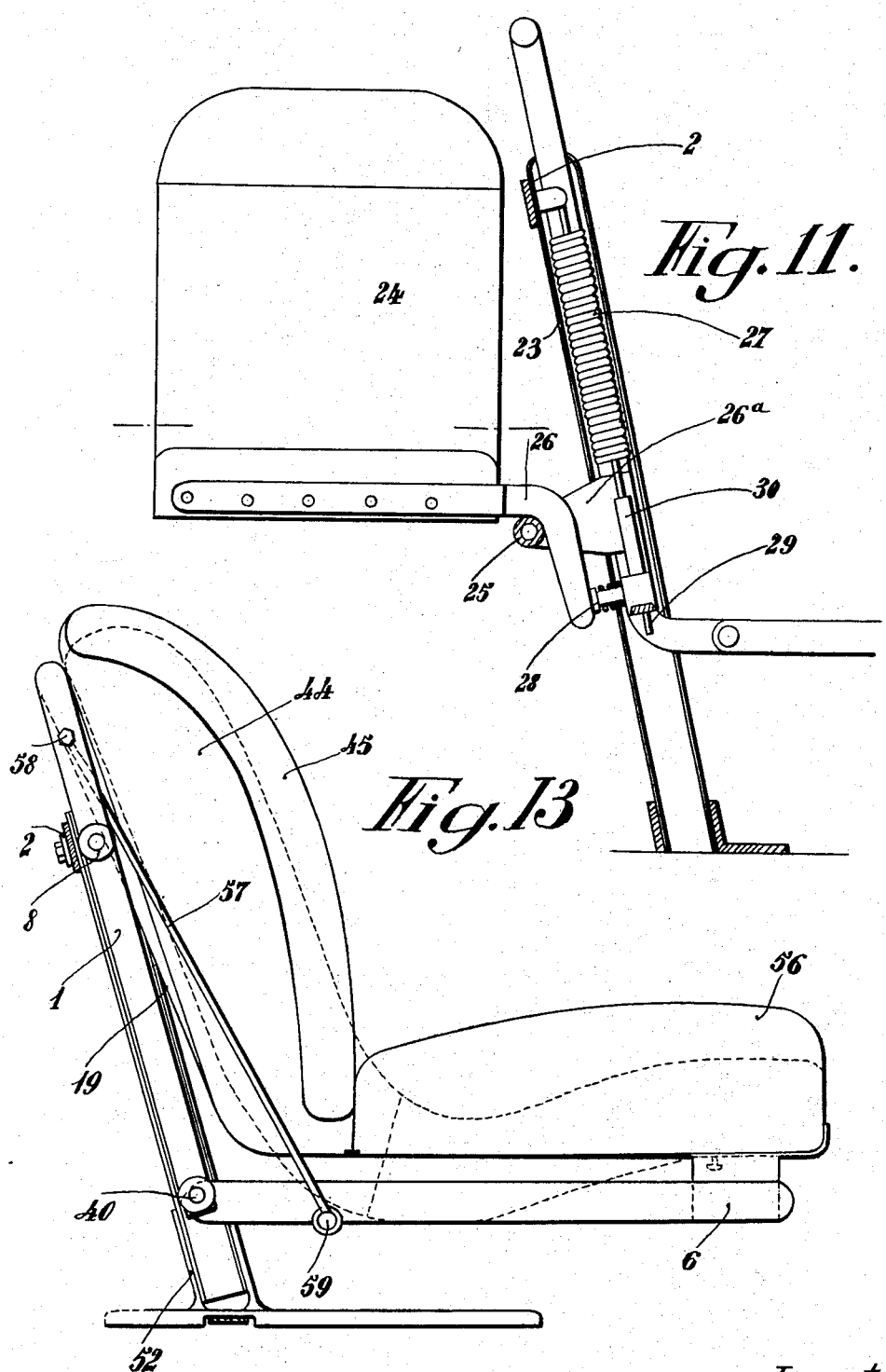
Inventor
Auguste A.G. Mougeotte
by Wilkinson & Giusta
Attorneys.

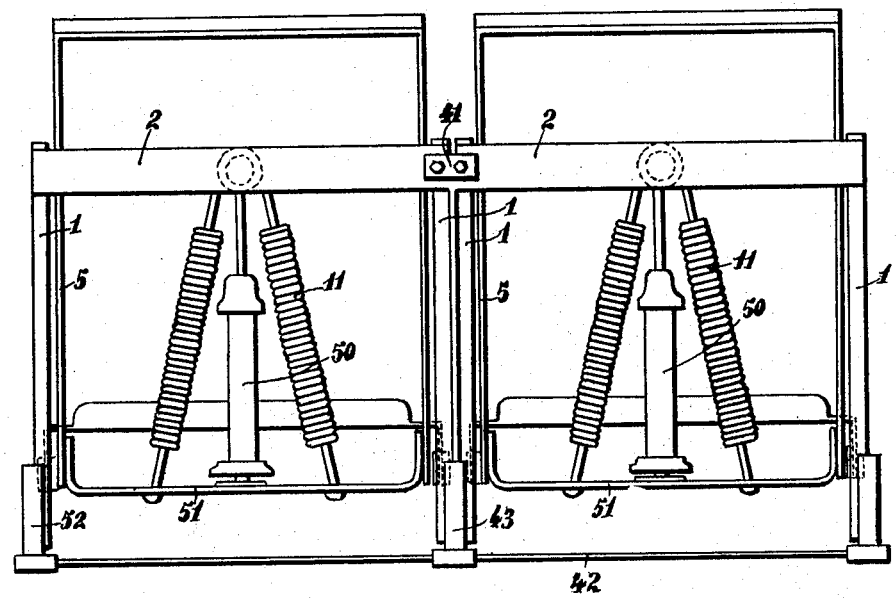
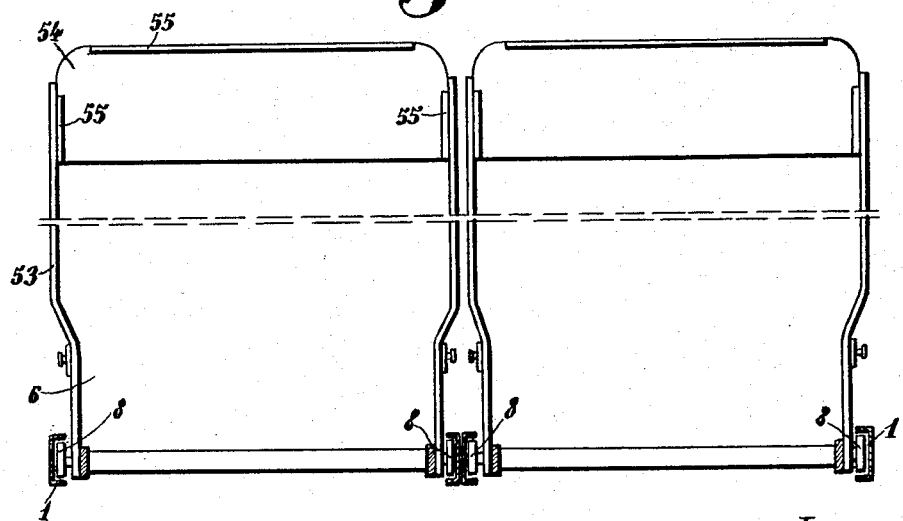

Patented July 8, 1930

1,770,321

UNITED STATES PATENT OFFICE

AUGUSTE ANGELE GASTON MOUGEOTTE, OF MELAY, FRANCE

CHAIR

Application filed April 16, 1928, Serial No. 270,374, and in France April 26, 1927.

The present invention relates to an improved arm-chair very comfortable to sit in and which has been specially designed for use in motor-cars.

The object of the present invention is to provide a well sprung arm-chair enabling motorists in particular to take long trips even over bad roads without tiring the body.

In a general way, the arm-chair according to the present invention is essentially characterized by the combination of a fixed frame and a carrier unit (seat and back) elastically connected to the aforementioned frame so as to be able to shift relative thereto under the influence of unevennesses in the ground.

Other characteristics and peculiarities of the present invention will be gathered from the detailed description about to be given in conjunction with the accompanying drawings in which:

Fig. 1 is an elevation of a form of construction of the armchair in conformance with the invention unfolded for use, the front upright of the fixed frame being supposed to be removed.

Fig. 3 is a plan view corresponding to Fig. 1 and showing the position of the rollers with respect to the uprights.

Fig. 5 is a similar view to Fig. 1 of another form of construction of the invention.

Fig. 6 is a section in the longitudinal median plane of a form of construction of the invention.

Fig. 7 is a section on VII—VII Fig. 6.

Fig. 8 is an elevation of another form of construction.

Fig. 9 is a section similar to that of Fig. 6 of another form of construction.

Fig. 10 is an elevational view of the armchair equipped with a bracket-seat and capable of being converted into a chair-couch.

Fig. 11 is a partial elevation similar to that of Fig. 10, the front uprights of the back structure and fixed frame being removed however to show how the bracket-seat is hooked on.

Fig. 12 is a sectional detail view showing the device for bringing an additional spring into action when the bracket-seat is used.

Fig. 13 is an end view of a bench designed in accordance with the invention, the front upright of the armchair being removed.

Fig. 14 is a corresponding back view.

Fig. 15 is a diagrammatic view of the seat structure of a bench.

Figure 2:
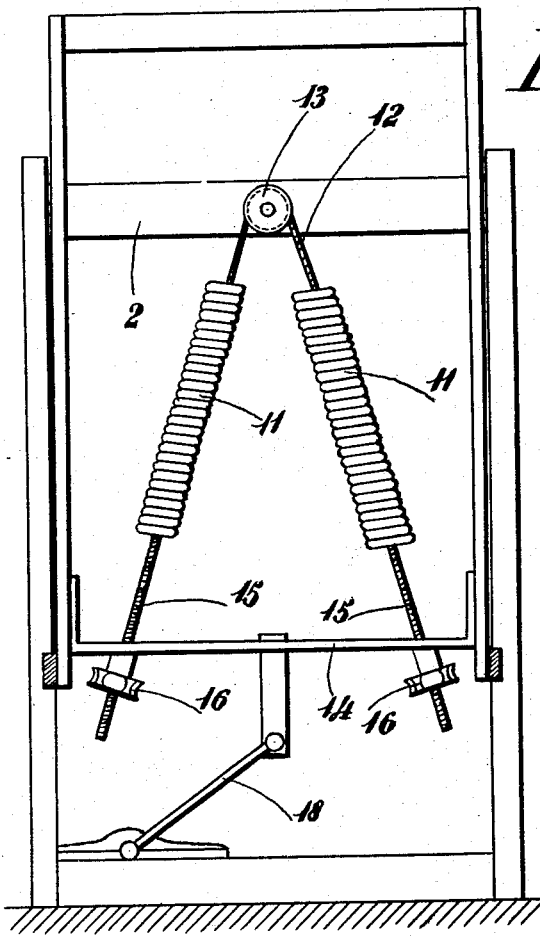
Fig. 2 is a sectional end elevation on line II—II Fig. 1.
Figure 4:
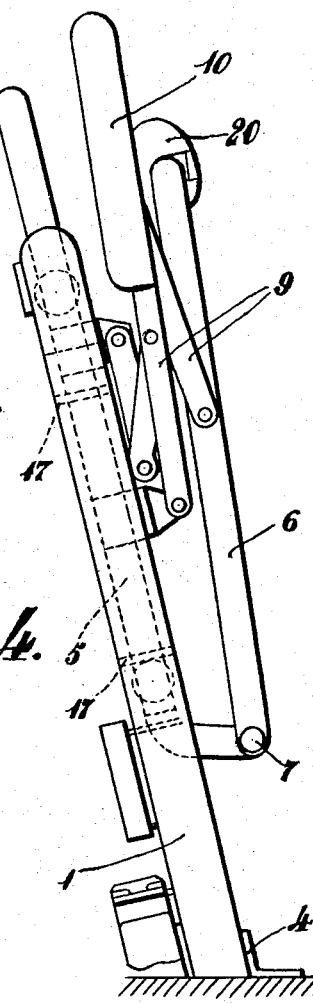
Fig. 4 is an elevational view of the armchair folded up.

Reference being had to Figs. 1, 2, 3 and 4, the armchair is essentially constituted by a fixed frame comprising two uprights 1 connected together by crossbars 2 and 3 and fixed to the floor of the vehicle by any appropriate means such as angle irons 4. The two uprights 1 are constituted by U-iron channels and run parallel to each other in such wise that the open sides of the U channels of the two uprights face each other.

Said fixed frame supports a carrier unit comprising the seat and back proper, the structures of said seat and back being constituted by two U channels 5 and 6 pivoted together through the medium of horizontal pins 7. The seat structure 5 is provided on either side with two rollers 8 fitting between the open sides of the U channels constituting the uprights 1. Furthermore, the back and seat structures 5 and 6 are connected together by a system of hinged metal links 9 supporting the elbow-rests 10 of the armchair. This system of hinged links 9 is so designed that the seat structure 6 and the back structure 5 form between them a predetermined angle enabling the user to be comfortably seated in the armchair. Moreover, this system of hinged links 9 enables the seat structure 6 to be folded up against the back structure 5 when the armchair is not in use.

The carrier unit which has just been described is elastically connected to the fixed frame through the medium of two springs 11. These two springs 11 are connected together at one end by a cable 12 passing over a grooved pulley 13 mounted on the crossbar 2 connecting the two uprights 1. The opposite ends of the springs 11 are connected to a crossbar 14 staying the two lateral uprights of the back structure 5. As illustrated, instead of being fixed directly to the crossbar 14, the ends of the springs 11 are fixed through the medium of a stretching device constituted by two screw-threaded rods 15 on which are threaded two knurled nuts 16.

In order to limit the displacements of the carrier unit relative to the frame, rubber pads 17 are provided between the sides of the U channels forming the uprights 1, whilst a shock absorber 18 may likewise be provided between the carrier unit and the fixed frame to regulate the oscillations of the former relative to the latter.

The seat proper is constituted by an upholstered canvas sheet 19 connecting together the two ends of the carrier unit on the hammock principle as it is applied to deck chairs.

In addition to the upholstered canvas sheet, a system of stuffed blade springs 20 or the like intended to afford a softer support for the legs is provided on the lower end of the seat structure 6.

With the armchair as just described, when the passenger is seated, the canvas 19 moulds itself to the shape of the body and thus affords a very large bearing surface and a uniform and minimum pressure per square inch, whereby the flesh is almost entirely prevented from aching. At each unevenness in the road, the carrier unit, that is to say the seat and back, is displaced by the rollers 8 rolling within the uprights 1 and no irksome and tiring friction is felt as is the case with other types of seats used in which the back is fixed and whose seat may collapse more or less on its springs.

It will be observed furthermore that the springs absorb the shocks transmitted in a very flexible manner due to their length and the great number of coils they comprise. Furthermore, the reaction and oscillations of these springs, especially as regards the rear seats may be regulated at will by the shock absorber 18. It is moreover evident that the springs 11 are designed according to the weight of the person whom the seat has to support. Moreover, when the armchair is to be used either by children or by grown-ups, the variations in weight may be allowed for by altering the tension of the springs 11 by means of the threaded rods 15 and knurled nuts 16.

The form of construction of the above described armchair may be modified to a certain extent whilst still retaining the principle of a carrier unit elastically mounted on a fixed frame.

For example, in the alternative form of construction illustrated in Fig. 5, the carrier unit is hinged to the uprights of the frame 1 by means of four links 64 pivoted at the points at which they are fixed to the frame and the carrier unit. The suspension spring 60 and a shock absorber 63 span the gap between the crossbars 2 connecting the uprights 1 of the fixed frame and the crossbars 51 connecting the uprights 5 of the carrier unit.

When unloaded, the carrier unit 5 assumes the position shown in full lines; when loaded, it takes up the position illustrated in dotted lines.

Another form of construction has been illustrated in Figs. 6 and 7, in which the sides of the U-irons are turned outwardly and in which buffer springs are provided.

As illustrated, the uprights 1 of the fixed frame are turned outwardly and as in the first device described above, they take the rollers 8 of the carrier unit 5. This latter is completely framed about the fixed frame 1.

According to one of the improvements of the present invention, buffer springs 65 are mounted on angle irons 66 which are themselves fixed to the uprights 1. Two other angle irons 67 are fixed to the structure 5 and can come into position for compressing the springs 65 which damp the end of the displacement of one of the structures with respect to the other, and thus avoid a sudden shock if the force which has produced such displacement is sufficiently great for one of the structures to have a certain speed relative to the other at the end of the displacement in spite of the opposing force of the spring 60.

In the form of construction illustrated in Fig. 8, the oscillations of the armchair's carrier unit relative to its fixed frame are damped by means of a spring 60 one of whose ends is secured as at 61 to the crossbar 2 whilst the other end is secured to the crossbar 51 through the medium of a stretcher 62. With the spring 60 there cooperates a shock absorber 63 likewise acting between the crossbar 2 of the fixed frame and the crossbar 51 of the carrier unit, the shock absorber 63 being arranged parallel to the spring 60 which is preferably situate centrally of the back of the armchair.

In the form of construction of the invention illustrated in Fig. 9, the fixed frame 1 and the back structure 5 are constituted by tubes sliding one within the other. The suspension springs 11 are situate within one of the tubes between the end of the other tube and a stop 68 located within the first tube. The shock absorber 63 is still disposed between the crossbars 2 and 51 respectively carried by the fixed frame and the back structure. The seat 6 of the carrier structure is hinged as at 6ª to the back 5 and can be folded up against said back 5 as shown in Fig. 9. Furthermore, the seat and back unit may be laid down over the floor of the vehicle by suitably pivoting the uprights 1 of the fixed frame, as has been shown at 69 in Fig. 9.

Instead of constituting the seat proper by means of an upholstered canvas as has been indicated above, stuffed cushions might be provided as has been indicated in dotted lines in Fig. 10.

The device of Fig. 10 answers to the case in which it might be useful to convert the armchair into a chair couch, in particular for ambulance cars. In this case, at the front end of the seat structure 21 is hinged a second structure 22 which in ordinary circumstances may be pushed back under the seat 21 as shown.

Finally, the same figure 10 shows how a detachable bracket-seat may be provided behind the back structure 23. Such bracket-seat 24 is secured to the back structure 23 and on this account takes advantage of the suspension of the carrier unit.

In Figs. 11 and 12, the method of hooking the bracket-seat 24 to the back structure 23 has been illustrated so that when in use, said bracket-seat 24 can bring an additional spring into action, compensating the extra weight taken by the carrier unit of the armchair.

In these figures, it will be observed that the bracket-seat 24 is mounted in position through the medium of hooks 26 fitting over a tube 25 secured to the back structure 23 by means of lugs 26ª. In addition to the springs provided for the armchair, a third spring 27 is provided, the upper end of which is connected to the crossbar 2 of the armchair and the lower end to a blade 29 which can slide in a guide-way 30. Said blade 29 has an opening 31 drilled in it opposite which is located a spring actuated finger 28 which the rear bracket-seat fixing hook 26 can abut.

When the bracket-seat 24 is pulled down for use, the rear hook 26 bears against the spring finger 28 which enters the hole 31 provided in the blade 29. It follows that the bracket-seat 24 is thus coupled to the spring 27 and that in consequence the latter compensates the additional weight supported by the carrier unit of the armchair proper.

It is obvious that said bracket-seat can only be provided on the front seats of the vehicle.

In the device illustrated in Figs. 13, 14, 15, the shock absorber 50 intended to damp the oscillations of the carrier unit relative to the fixed structure, and consequently, to the floor of the vehicle, is mounted between the upper crossbar 2 connecting the uprights 1 of the fixed structure and a crossbar 51 secured to the carrier unit, which crossbar, in the example illustrated, is secured to the lateral uprights of the back structure 5. This method of mounting facilitates the erection of the shock absorber 50 and enables the same to operate under better conditions. The lower ends of the uprights 1 of the armchair are fitted into metal shoes 52 suitably inclined and which fix the armchair to the floor of the vehicle.

In the form of construction illustrated in Figs. 13 to 15, the seat structure 6 is constituted by two metal side members 53 of any suitable section connected together at their front ends by a metal plate 54 the front edges 55 of which are raised so as to hold in place the cushion 56 forming the seat proper.

The back structure 5 is connected to the seat structure 6 through the medium of flexible braces 57 fixed .c one end to studs 58 secured to the uprights 1 of the fixed frame and, at the other end, to studs 59 secured to the side members 53 of the seat structure 6. In order that the studs 59 shall not protrude laterally beyond the side members 53 of the seat structure 6, said side members 53 are cranked at a point proximate to their pivot axis 40, on the back structure 5, as is more clearly to be seen in Fig. 15. This arrangement of the studs 59 in the proximity of the pivot axis of the two structures constituting the carrier unit furthermore enables the front portion of the seat structure to be completely freed.

These alterations which can be applied to the case of a single armchair likewise obtain in the case in which two armchairs are used to form a bench, as is more particularly the case in the example illustrated in Figs. 13 to 15. In order to form a bench, two armchairs of exactly the same dimensions and assembled as previously indicated, are placed side by side. These two armchairs are connected together, on the one hand, by a stay 41 connecting together the two crossbars 2 which stay the uprights 1 of each armchair and, on the other hand, by a metalic crossbar 42 connecting together the various fixing shoes of the two armchairs. In the case of the bench, the two uprights 1 situate side by side, are secured to one and the same shoe 43, from which it follows that in order to fix the bench to the floor of the vehicle, only three metallic shoes need be used instead of four if the two armchairs were fixed separately.

Since the armchairs constituting the bench have the same dimensions, it follows that they are both at the same level and constitute a continuous surface on which one or more persons can be seated.

In the example shown, the seat proper is constituted by a piece of canvas 19 supporting the cushions 56 and 44, the cushion 44, that is to say the cushion forming the back, is narrower at the rear in order to pass more freely between the braces 57, whilst at its front end and on either side it is provided with portions 45 intended to conceal the braces 57.

Finally, in Fig. 13, the position of the cushions 56 and 44 when the armchair or bench is not being used, has been illustrated in full lines, whilst the position taken up by such cushions when someone is seated in the armchair or bench has been illustrated in dotted lines.

It is moreover self-evident that the invention has only been described and illustrated here in a purely explanatory but by no means limitative manner, and that it could be subjected to various modifications of detail without departing from the spirit thereof.

I claim:

1. A chair comprising in combination, a fixed frame including two lateral uprights and a connecting crossbar therebetween, a back structure displaceable relative to said frame and comprising two lateral uprights and a connecting crossbar therebetween, a seat structure connected to said back structure and forming with said back structure a constant angle irrespective of the displacement of said structures relative to said fixed frame, a spring system connecting said frame and back structure crossbars, and cooperating means provided on said frame and back structure uprights respectively for guiding said back structure in its displacement relative to said frame.

2. A chair comprising in combination, a fixed frame including two lateral uprights and a connecting crossbar therebetween, a back structure displaceable relative to said frame and comprising two lateral uprights and a connecting crossbar therebetween, a seat structure connected to said back structure and forming with said back structure a constant angle irrespective of the displacement of said structures relative to said fixed frame, a spring system connecting said frame and back structure crossbars, a shock absorber mounted between said movable back structure and a fixed point, and cooperating means provided on said frame and back structure uprights respectively for guiding said back structure in its displacements relative to said frame.

3. A chair comprising, in combination, a fixed frame including two U-channel uprights, a carrier structure comprising a rigid back and a rigid seat connected together and displaceable as a whole relative to said frame, means for flexibly suspending said carrier structure from said frame, and links whose ends are pivoted to said carrier structure and fixed frame respectively.

4. A chair comprising in combination, a fixed frame comprising two lateral U-channel uprights stayed by a connecting crossbar, a back structure displaceable relative to said frame and comprising two lateral uprights stayed by a connecting crossbar, a seat structure pivotally connected to said back structure and unconnected to said fixed frame, a spring system connecting said frame and back structure crossbars, rollers mounted on said back structure uprights and rolling in said U channels of said frame, springs housed in said U channels of said frame, and projecting members carried by said back structure uprights and adapted to come up against said springs for checking the end of said back structure's displacement.

5. A chair comprising, in combination, a frame including two uprights, a back structure displaceable relative to said frame and including two uprights, said frame uprights and back structure uprights being mounted in pairs to slide one within the other, a seat structure hinged to said back structure and adapted to move with said back structure without pivoting relatively thereto, and springs adapted to damp the relative displacements of said uprights.

6. A chair comprising, in combination, a fixed frame including two uprights, a carrier structure displaceable as a whole relative to said fixed frame, a spring system for elastically suspending said carrier structure from said fixed frame, a bracket-seat hingedly secured to said carrier structure, an additional spring adapted to compensate the extra load of said bracket-seat, and means actuated by said bracket-seat when in position for use for bringing said spring into action.

AUGUSTE ANGELE GASTON MOUGEOTTE.